Sept. 4, 1923.
J. J. DOOLEY
WELDING ELECTRODE HOLDER
Filed Nov. 12, 1921
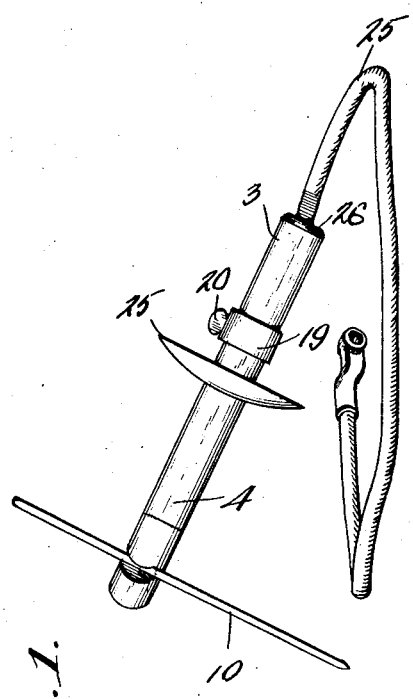
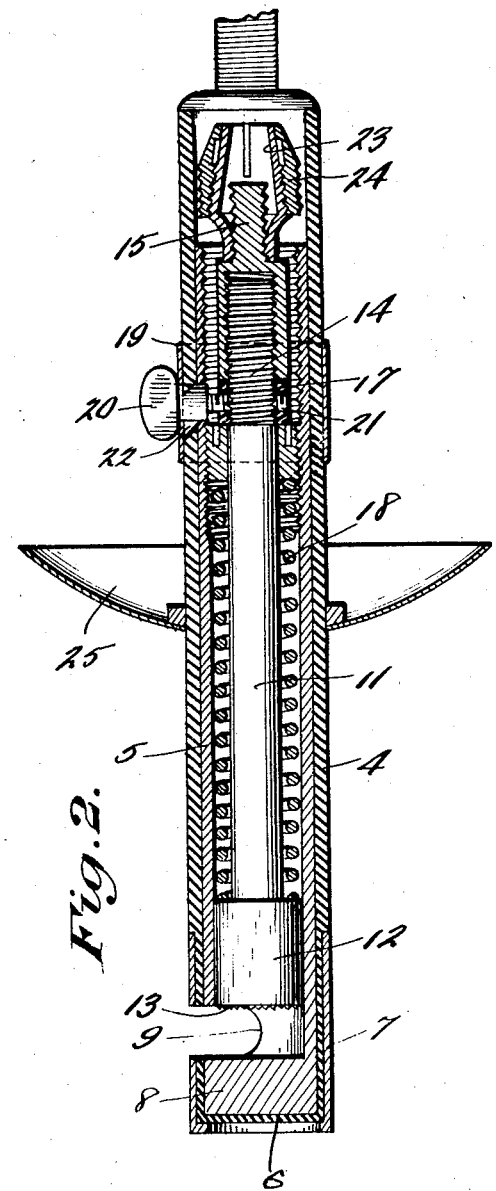
John J. Dooley, INVENTOR.
BY
Richard B. Owen.
ATTORNEY.

Patented Sept. 4, 1923.

1,467,028

UNITED STATES PATENT OFFICE.

JOHN J. DOOLEY, OF BOOTLE, LIVERPOOL, ENGLAND.

WELDING ELECTRODE HOLDER.

Application filed November 12, 1921. Serial No. 514,821.

*To all whom it may concern:*

Be it known that I, JOHN J. DOOLEY, a subject of the King of Great Britain, residing at Bootle, Liverpool, England, have invented certain new and useful Improvements in Welding Electrode Holders, of which the following is a specification.

The present invention consists of a welding electrode holder and has primarily for an object the provision of a device which will permit expeditious insertion and removal of the electrode as well as adapting the holder for use with electrodes varying in diameter.

Another object of the invention is to provide a holder of convenient size to be handled with facility by a welder, suitable means being provided to protect the welder during use of the device.

A further object of the invention is to provide a simple and comparatively inexpensive device of this character to which the conductor may be easily and positively secured.

The above and other objects of this invention will be in part described and in part understood from the following description of the present preferred embodiment of the invention taken in connection with the accompanying drawings wherein:—

Fig. 1 is a perspective view of a welding electrode holder constructed in accordance with this invention illustrating its application; and Fig. 2 is a longitudinal sectional view of the holder per se.

The device of this invention consists of a body generally designated 3 which comprises a cylindrical outer insulated casing 4 and a complemental inner casing 5 preferably made of metal. One end of the outer casing is closed, as indicated at 6, while the opposite end is open. The closed end of the casing 4 is equipped with a metal sleeve 7 the lower terminal of which is bent inwardly at right angles to engage the closed end 6 of the casing. The inner casing 5 has one end thereof enlarged, as indicated at 8, for engagement with the closed end 6 of the casing 4. The opposite end of the casing 5 terminates short of the opposite end of the casing 6 and is likewise open. The casings 4 and 5 as well as the sleeve 7 are cut out to provide a pocket or slot 9 which is adapted for the reception of an electrode such as that indicated at 10.

Slidably mounted in the sleeve 5 is an electrode clamping bar 11 one end of which is enlarged to provide a cylindrical head 12 which frictionally engages the inner periphery of the casing 5. The free end of said head is serrated, as indicated at 13, to prevent slippage of the electrode. The opposite end of the electrode clamp, to that which carries the head 12, is provided with screw threads 14 which engage complemental threads formed in the socket of a shank 15. The said clamping bar slides through a guide collar 16 which is threaded into engagement with the inner periphery of the inner casing 5. An insulated collar 17 is interposed between the shank 15 and the guide 16. In order to normally force the head 12 of the clamping bar into the pocket 9, a coil spring 18 is provided which is convoluted on said bar and has one end thereof in engagement with the head 12 while the opposite end engages the guide 16.

Suitable means is provided for disengaging the bar 11 from the electrode 10 and consists of a band 19 which embraces the outer casing 4 and carries a clamp bar engaging member 20. This member embodies a threaded shank 21 which extends through an oblique slot 22 formed in the casing 4 as well as through an aligning opening formed in the casing 5 and projects through the threaded end 14 of the clamping bar 11. Upon reference to Fig. 2 of the drawings, it will be noted that the threaded shank 21 also projects through the insulated collar 17 for an obvious purpose. The outer end of the shank 21 is enlarged and terminates in a knob. When it is desired to disengage the head 12 from the pocket 9 lateral pressure is exerted upon said knob causing the band to be rotated and correspondingly moving the shank through the slot 22. The movement correspondingly raises the clamping member 11 against the resistance of the spring 18. Of course, as soon as the knob is released the head 12 will be re-engaged in the pocket 9 by the expansive action of said spring.

The outer end of the shank 15 is screw threaded and is engaged by an expansible and contractible conductor receiving socket 23. The said socket is in turn engaged by a detachable contracting member 24. The conductor may comprise a cable 25 of standard design which is equipped with a plug 26 insertible in the opposite end of the outer casing 4, as shown in Fig. 1.

In order to protect the hand of the welder a guard member 25 is adjustably mounted on the outer casing 4. The guard member 24 in the present instance consists of a semi-circular shield.

It is apparent from the above that an electrode of carbon or any other material may be mounted in the pocket 9 and clamped therein through the action of the clamping bar 11. When it is desired to release the electrode, the clamping bar is disengaged from the pocket in a manner above described. Moreover, the plug 26 may be removed with facility to permit the device to be conveniently transported. Moreover, the device as an entirety may be made relatively small so as to enable it to be conveniently handled. Furthermore, by providing the sleeve 7 the device may be laid down on any part of the work by the operator, without making contact. Also, the construction of the device provides an allowance for an oscillating movement without moving the cable, which makes it possible to obtain a very fine arc adjustment, without any unnecessary energy.

Various changes may be made in this device especially in the details of construction, proportion and arrangement of parts within the scope of the appended claims.

What is claimed is:—

1. A welding electrode holder including an outer insulating casing one end of which is closed and equipped with a metal sleeve, a metal casing mounted in said outer casing having one end thereof enlarged and engaged with the closed end of the outer casing, said casing having an electrode receiving pocket formed therein above said enlarged end of the inner casing, and means mounted in said inner casing to clamp the electrode into engagement with said enlarged end.

2. A welding electrode including an outer insulating casing and an inner conductive casing, a guide collar adjustably mounted in said inner casing, a clamping bar slidable in said guide collar, and a band slidably mounted on said outer casing and equipped with means for urging said bar into an inoperative position.

In testimony whereof I affix my signature in presence of two witnesses.

JOHN J. DOOLEY.

Witnesses:
 THOMAS HANNAH,
 A. J. WALKER.